United States Patent [19]

Strick

[11] 4,379,585
[45] Apr. 12, 1983

[54] EXTERNAL DOOR FOR VEHICLES

[76] Inventor: Leonard Strick, 2401 Pennsylvania Ave., Philadelphia, Pa. 19130

[21] Appl. No.: 258,148

[22] Filed: Apr. 27, 1981

[51] Int. Cl.³ .............................................. B60J 5/12
[52] U.S. Cl. ................................... 296/146; 296/50; 296/155; 160/195
[58] Field of Search ................. 296/50, 51, 24 R, 106, 296/146; 160/195, 201; 49/197, 200

[56] References Cited

U.S. PATENT DOCUMENTS

| | | | |
|---|---|---|---|
| 2,069,665 | 2/1937 | Bouthillier | 160/195 |
| 3,118,702 | 1/1964 | Kale et al. | 296/106 |
| 3,135,544 | 6/1964 | Mickey et al. | 296/24 R |
| 3,140,910 | 7/1964 | Kappen | 296/51 |
| 3,247,637 | 4/1966 | Robertson | 160/201 |
| 3,572,815 | 3/1971 | Hackney | 296/40 |
| 3,693,693 | 9/1972 | Court | 160/195 |
| 3,894,571 | 7/1975 | Hinchliff | 160/201 |
| 4,049,311 | 9/1977 | Dietrich | 296/24 R |
| 4,099,764 | 7/1978 | Ratliff | 296/24 R |

Primary Examiner—Robert R. Song
Attorney, Agent, or Firm—Duffield & Lehrer

[57] ABSTRACT

A roll-up door assembly for a vehicle body having a roof, a pair of opposed sidewalls and an end wall including an opening into the interior of the body and over which the door assembly is disposed. The door assembly is located externally of the body adjacent the opening and includes a sliding door which is slidable from a stored position above the roof to a pivoted open position wherein the door covers the opening but is pivoted outward from the opening about a pivot axis located adjacent the bottom of the opening. The door is pivotable to a pivoted closed position wherein the door is pivoted toward the opening to fully close the opening. The door is located within fixedly mounted track means when in the stored position. The fixedly mounted track means are mounted externally of the body adjacent the roof and the sidewalls. The door is rolled into pivotable track means when it is in either the pivoted open or pivoted close position. The pivotable track means are pivotable about a pivot axis between the pivoted open and pivoted close position. In the pivoted open position, the movable track means communicate with the fixed track means to enable the door to be moved from the former to the latter and vice versa.

17 Claims, 6 Drawing Figures

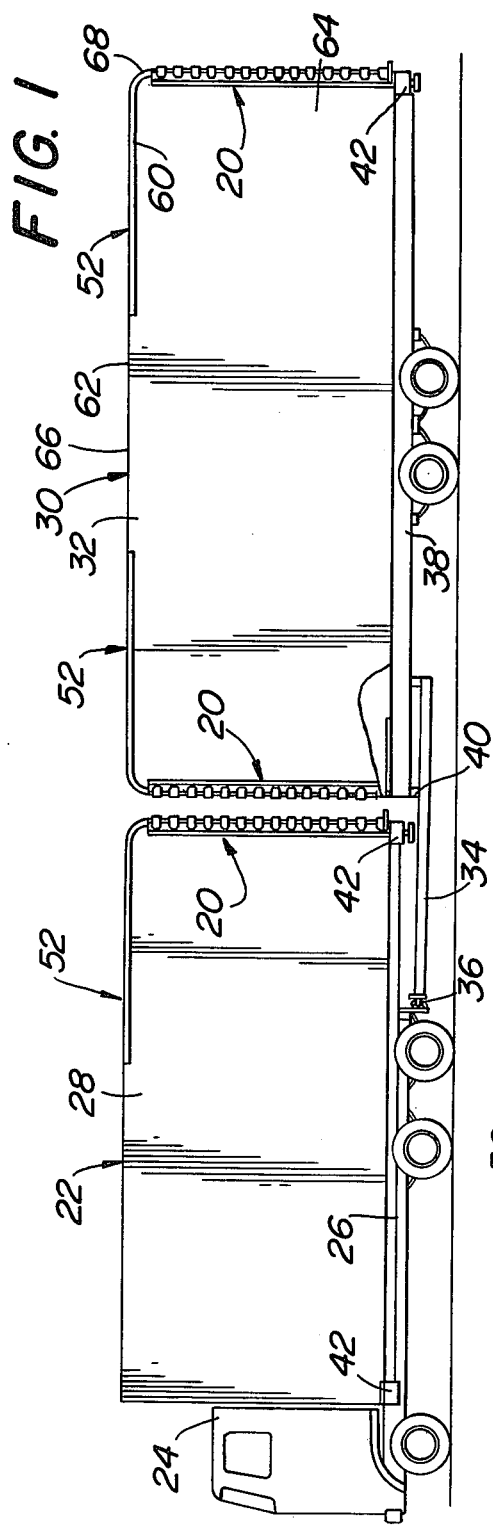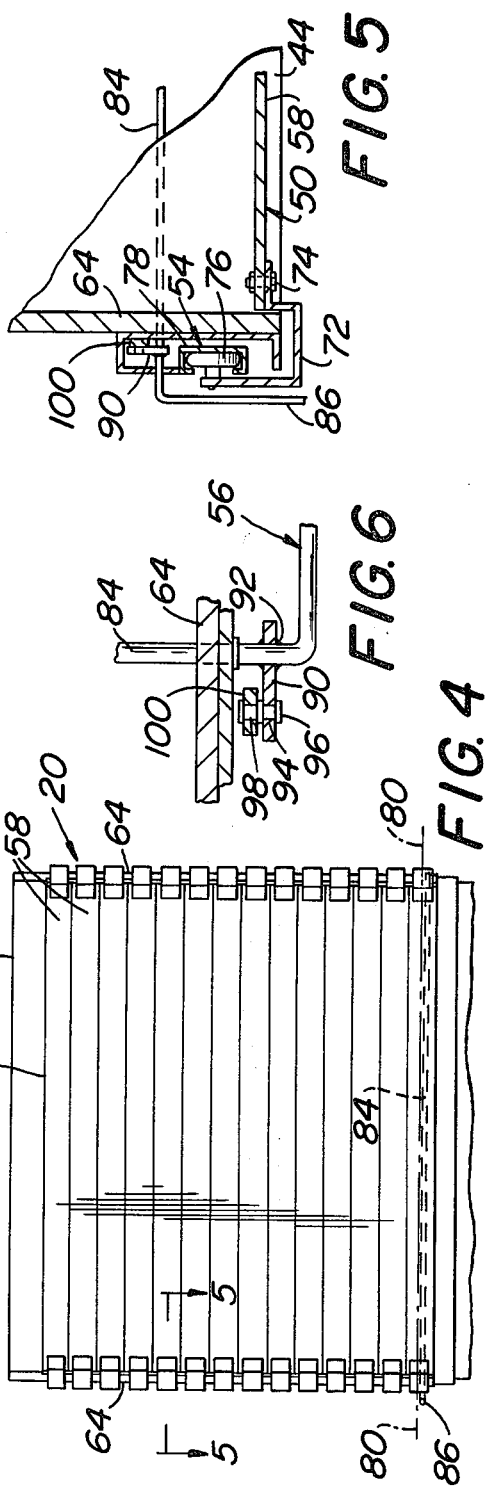

EXTERNAL DOOR FOR VEHICLES

This invention relates generally to door assemblies for vehicle bodies and, more particularly to sliding or roll-up door assemblies for vehicle bodies.

The patent literature is replete with various door assemblies for closing the opening of the cargo holding bodies of trailers, trucks or other vehicles. Examples of various disparate roll-up door assemblies for vehicles are found in the following U.S. Pat. Nos.: 3,135,544 (Mickey et al), 3,140,910 (Kappen), 3,118,702 (Kale et al), 3,247,637 (Robertson), 3,572,815 (Hackney), 3,693,683 (Court), 3,894,571 (Hinchliff), 4,049,311 (Dietrich et al), and 4,099,764 (Ratliff).

While prior art door assemblies are generally effective for closing openings to the cargo area of the vehicle body, such doors have nevertheless exhibited various drawbacks. For example, the roll-up doors of the prior art have heretofore been mounted internally in the body to roll-up from a vertical or "closed" position to an "open" or retracted position within the body and under the roof adjacent the opening. Needless to say, such an arrangement wastes valuable interior space, thereby reducing the cargo capacity of the vehicle. In addition, prior art roll-up door assemblies have exhibited a tendency to jam in the event that the cargo within the body shifts to the rear and engages the interior surface of the door when the door is in the closed position. In the event that such jamming action occurs, it is frequently necessary to lift the rear of the vehicle body to cause the cargo to shift toward the front, thereby releasing the door. Needless to say, the tendency to jam of prior art roll-up doors is a decided disadvantage of such doors.

Accordingly it is the general object of the instant invention to provide a sliding door assembly which overcomes the disadvantages of the prior art.

It is a further object of the instant invention to provide a roll-up door assembly which is mounted externally of the vehicle body, thereby increasing the storage capacity of the body.

It is a further object of the instant invention to provide a door assembly for vehicle bodies which resist jamming due to shifting loads.

These and other objects of the instant invention are achieved by providing in a vehicle body for holding cargo having a first end, a pair of opposed sidewalls and a roof, with the first end including an opening to the interior of the body, the improvement comprising an externally disposed sliding door assembly. The assembly includes sliding door means which is slidable from a stored position above the roof to a pivoted-open position. In the pivoted-open position, the door covers the opening but is pivoted outward from it about a pivot axis located adjacent the bottom of the opening. The door is pivotable to a pivoted-closed position in which the door is moved toward the opening to close the opening and lock the cargo within the body.

Other objects and many of the attendant advantages of the instant invention will be readily appreciated as the same becomes better understood by reference to the following detailed description when considered in connection with the accompanying drawing wherein:

FIG. 1 is a side elevational view of an articulated truck-trailer, constructed in accordance with the teachings of the invention set forth and claimed in my copending U.S. patent application Ser. No. 258,149, filed on Apr. 27, 1981, entitled Articulated Truck/Trailer Combination, and which includes roll-up doors constructed in accordance with the instant invention;

FIG. 4 is an end view of the trailer shown in FIG. 1;

FIG. 5 is an enlarged sectional view taken along line 5—5 of FIG. 4; and

FIG. 6 is an enlarged sectional view taken along line 6—6 of FIG. 3.

Figure 2:
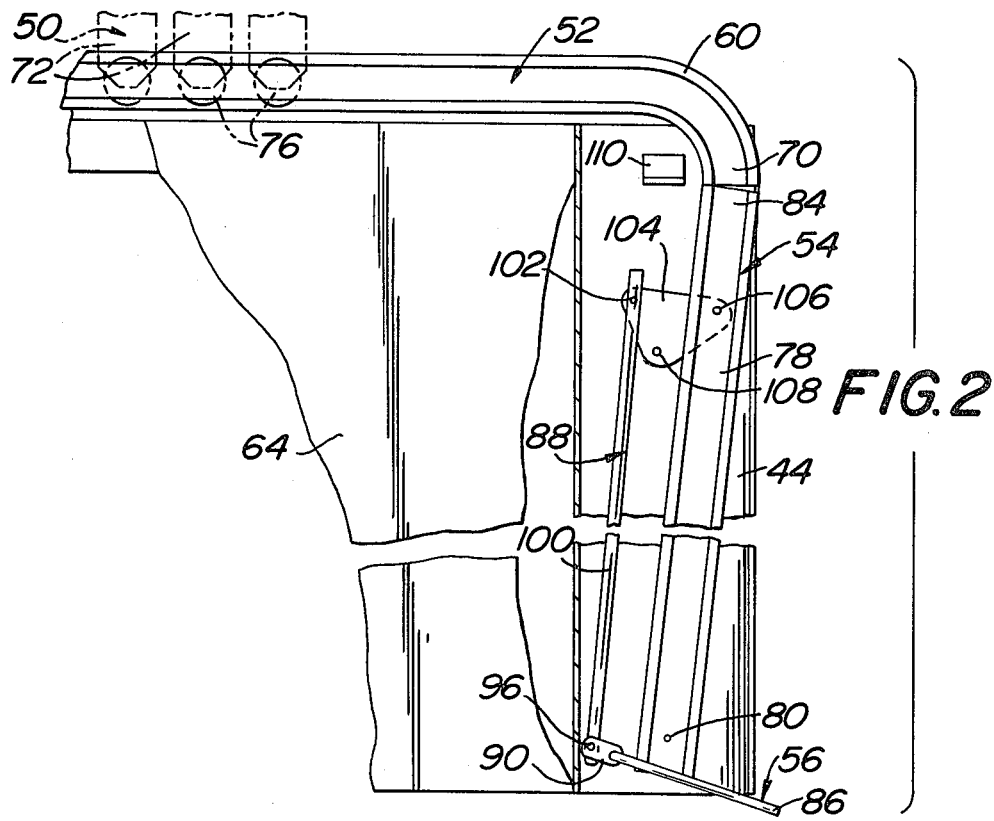
FIG. 2 is a side view of a portion of the rear of the trailer shown in FIG. 1 with the door of the instant invention being shown in the retracted or stored position.

Referring now to the various figures of the drawing wherein like reference characters refer to like parts, there is shown in FIG. 1 plural door assemblies 20, each constructed in accordance with the instant invention, used on an articulated truck-trailer combination 22, as set forth and claimed in my aforenoted co-pending patent application.

Before describing the details of the subject invention, a brief description of my invention in the articulated truck-trailer combination 22 is in order. As noted heretofore, that combination is the subject of my copending patent application Ser. No. 258,149 filed on 4-27-1981 and entitled Articulated Truck/Trailer Combination, and whose disclosure is incorporated by reference herein. To that end, the articulated truck-trailer basically comprises a tractor 24 having a chassis or frame 26 and a "fifth wheel" (not shown) and on which a removable cargo holding body 28 is mounted closely behind the tractor cab. A trailer 30, having a body 32, is connected to the body 28 on the tractor, via a tow bar 34, and an associated pintle hook 36. The tow bar 34 is permanently secured to the frame 38 of the trailer at points 40. The pintle hook 36 is permanently secured to the underside of the body 28.

In accordance with a preferred embodiment of the combination 22, the tow bar 34 extends approximately 9 feet (2.74 m) in front of the trailer body. The pintle hook 34 is located approximately 8 feet (2.43 m) from the rear end of the body 28. Accordingly, the spacing between the body 28 and the trailer body 32 is approximately 1 foot (30.5 cm).

When the body 28 is mounted on the tractor chassis 26 it, in effect, forms a truck body. When the body 28 is mounted on the fifth wheel of the frame 26, it is prohibited (by means, not shown) from pivoting about the fifth wheel so that the body remains fixed as the combination 22 goes around curves or corners. Moreover, even though the trailer body 32 is only separated from the "truck" body 28 by approximately 1 foot, the connection or pivot point of the tow bar 34 to the pintle hook 36 is sufficiently far, e.g., 9 feet (2.74 m), in front of the trailer body to provide a long swing angle between the two bodies so that the combination 22 can easily negotiate curves and corners.

Both the tractor and the trailer are mounted on small, e.g. 15 inch (38.1 cm) wheels so that the height of the floor of both bodies 28 and 32 are approximately 33 inches (83.8 cm) above the ground. Thus, both bodies have substantially greater cargo capacity than conventional trailer bodies having the same roof height with respect to the ground.

By virtue of the fact that the truck body 28 and the trailer body 32 are only separated by 1 foot as opposed to the 4 foot separation of conventional tandem equipment and the fact that both bodies are carried to the ground, the combination has a much greater cargo capacity than conventional vehicles for a given length vehicle. In this regard, for a maximum 55 foot length limit imposed by law, the combination 22 can carry approximately 4,700 cubic feet of cargo versus 3,000 cubic feet for conventional equipment. Moreover, since the truck body 28 is located on the chassis 26 of the tractor immediately behind the cab, the normal large tractor-trailer gap is eliminated, thereby further increasing cargo capacity and minimizing the fuel-consuming drag produced by the gap.

The truck body 28 and the trailer body 32 each include jacking or lifting means 42 which are constructed in accordance with the teachings set forth and claimed in my co-pending U.S. patent application Ser. No. 258,169 filed on 4-27-1981, entitled Jacking Means For Vehicle Bodies, and whose disclosure is incorporated by reference herein. That invention enables the bodies 28 and 30, to be elevated to a height suitable for loading and unloading at conventional cargo docks and bays, e.g. 48 inches (1.29 m). In addition, the fifth wheel of the tractor 24 is also elevatable so that it can be lifted to the conventional trailer hitching height, e.g., 54 inches (1.37 m), to enable the tractor to be used to pull conventional trailers.

As stated heretofore, the bodies 28 and 32 each include external door assemblies 20 constructed in accordance with the teachings of the instant invention. In particular, the trailer body 32 includes an external door assembly 20 at its rear end, and a similar door assembly at its front end. The truck body 28 also includes a door assembly 20 at its rear end. By virtue of the construction of the doors 20, the combination 22 can be loaded in a single drive-through plan by merely rolling up all of the doors.

Figure 3:
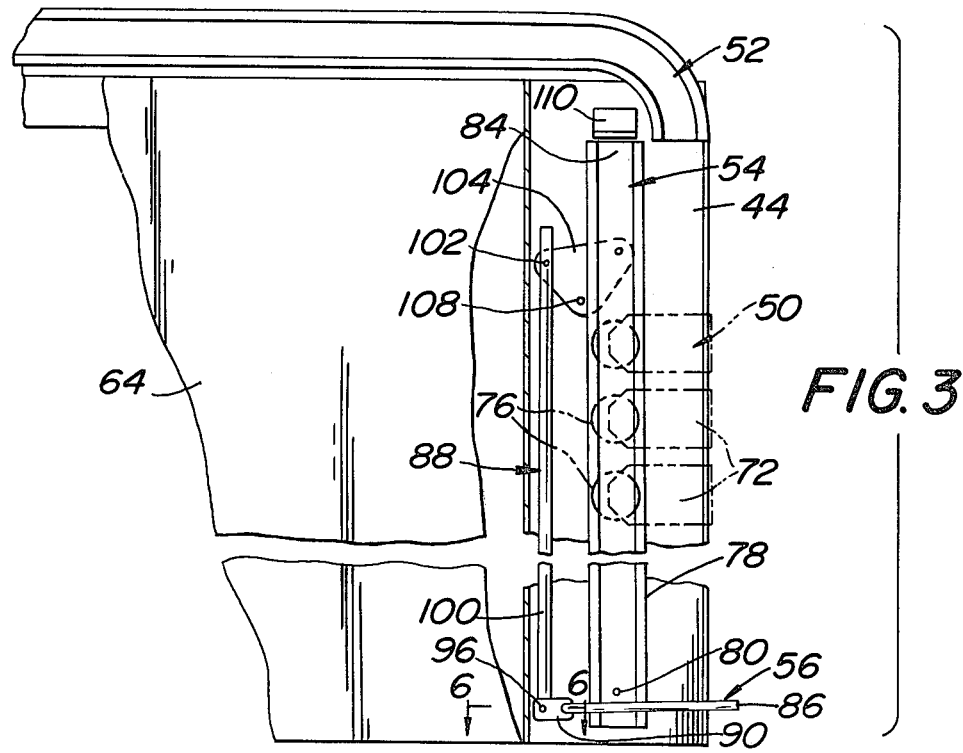
FIG. 3 is a side view, similar to that of FIG. 2, and showing the door in the closed position.

The door assemblies 20 on the bodies are identical so that only the details of the door assembly 20 on the rear end of the trailer body 32 will be discussed hereinafter. As can be seen in FIGS. 2, 3 and 4, the door assembly 20 basically comprises a slidable door 50, stationary track means 52, pivotable track means 54 and actuating means 56.

The door assembly is arranged, as will be described in detail later, to open and close the opening 44 in the end wall of the trailer body 32. To that end, the door is arranged to be moved from a "retracted" position in which the door is located outside of the body over the roof to provide total access to the interior of the body, through an intermediate or "covering" position in which the door is disposed over the opening but does not seal it to a "closed" or "locked" position in which the door is locked in place completely sealing the opening.

The door 50 is made up of a plurality of pivotally interconnected elongated slats or panels 58. The panels 58 are of conventional construction and are preferably formed as extrusions hingedly connected to each other so that the panels pivot with respect to each other to enable the door assembly to be slid between the retracted and closed portions. Examples of prior art hinged panels which can be used to form the door 50 are shown in U.S. Pat Nos. 3,118,702 (Kale et al), 3,135,544 (Mickey et al) and 3,572,815 (Hackney). Other constructions may also be used.

The stationary track means 52 are shown in FIGS. 1, 2 and 3 and comprise a pair of tracks 60, each of which is fixedly mounted outside the trailer body along the line 62 formed by the intersection of the body sidewall 64 and the roof 66. Each track 60 is an elongated linear channel-shaped member and includes an arcuate end 68 which curves downward and terminates in an open mouth or outlet 70 (FIG. 2). The outlet 70 of each track 60 forming the stationary track means 52 is disposed immediately adjacent the top of the opening 44 in the end wall of the trailer body 32.

A respective, generally L-shaped, bracket 72 is secured, such as by a respective bolt 74, to each end of the panel 58. An associated, freely rotatable roller 76 is mounted on the inside surface of the L-shaped bracket so that it faces toward the associated sidewall 64 of the trailer body 32. Each roller 76 on one side of the door 50 is arranged to roll within the associated channel-shaped track 60. Accordingly, the door means 50 can be slid from the fully retracted position, shown schematically by the phantom lines in FIG. 2, down the tracks and out of the outlets 70.

The movable track means 54 is arranged to be brought into communication with stationary tracks 60 at the outlet 70 to enable the door 50 to slide into the pivotable track means 54 for locking. To that end, the movable track means 54 basically comprises a pair of elongated linear, channel-shaped, tracks 78. One track 78 is mounted on one sidewall of the body adjacent the opening 44 and being inward, this is to the side of the openings. The other track is disposed on the other sidewall of the body adjacent the opening and facing the first track. Each track is mounted about a pivot axis 80. The pivot axis is horizontal and extends adjacent the bottom of the opening 44. Both tracks 78 are arranged to be pivoted in unison from the outward position shown in FIG. 2, wherein the upper end 84 of each track 78 is aligned with and communicates with the outlet 70 of an associated stationary track 60, to an inward position wherein the tracks 78 are pivoted to a vertical orientation, as shown in FIG. 3. The means for pivoting the tracks comprises the heretofore identified actuating means 56.

The actuating means 56 is in the form of a lever 82 having a transverse portion 84 (FIG. 4) extending parallel to axis 80 through both body sidewalls 64 and a handle portion 86 extending perpendicularly to the transverse portion. A pair of linkage assemblies 88 are fixedly secured to the transverse portion 84 of the lever adjacent each end thereof and outside of the associated sidewall 64. The linkages 88 are each arranged to couple the pivoting action of the handle means 86 to the tracks 78 to pivot the tracks from the position shown in FIG. 2 to the position shown in FIG. 3 and vice versa. To that end, each linkage means 88 comprises an arm 90 fixedly secured onto the transverse portion 84 of the lever, such as by a welded joint 92. The free end of the arm includes an opening 94 in which a pivot pin 96 is located. The pivot pin extends through an opening 98 in the lower end of an elongated link 100. The upper end of the link 100 includes an opening in which a pivot pin 102 is disposed. The pivot pin 102 extends through an aligned opening in one corner of a generally triangular-shaped rocker plate 104. Another pivot pin 106 is located in another corner of the rocker plate 104 and extends into an aligned opening in the upper portion of an associated track 78. The rocker plate is pivotably mounted on a pin 108 on the sidewall 64 of the body 32. The pin 108 is located in the third corner of the rocker plate. Identical linkage means 88 is connected to the opposite end of the rod portion 84, to the other track 78 and to the other sidewall 64 of the body in the same manner as described heretofore.

As will be appreciated by those skilled in the art, when the handle portion 86 is rotated downward (clockwise as shown in FIG. 2), both links 100 move upward, thereby causing their associated plates 104 to pivot in the clockwise direction about associated pins 108. This action causes both tracks 78 to pivot in the clockwise direction about pivot axis 80 to the position shown in FIG. 2. In that position, the upper end 84 of each track is in communication with the outlet 70 of the stationary tracks 60. Accordingly, the door means 50 can be slid or rolled from the position shown in FIG. 2 down the track toward the outlet, through the outlet and into the tracks 78. This action disposes the door 50 over the opening 44. In order to lock the door in place, the handle 86 is rotated in the counter clockwise direction, whereupon the links 100 pull the associated plates 104 in the counter clockwise direction about pins 108 so that the associated tracks 78 pivot in a similar direction about pivot axis 80 to the vertical position shown in FIG. 3. In this position, the door completely closes the opening 44. A stop member 110 is mounted on each sidewall 64 of the body adjacent the end 84 of the track when the track is in the position shown in FIG. 3 to prevent the rollers from the door 50 from exiting the track when the door is in the locked position.

The sliding of the door can be effected in various ways, such as manually, or through the use of powered means, such as an electric motor. In the latter case, the motor may be connected to a rotary shaft disposed below the floor and having a cable take-up reel over which a retractable cable is wound. The cable is connected to the door, via pulleys and sheaves to raise and lower the door, as desired.

As will be appreciated from the foregoing, by mounting the door so that when it is in the retracted position it is disposed over the roof. Considerable interior space within the body is made available for the storage of additional cargo. This is a considerable advantage over the prior art roll-up door assemblies which dispose the door within the body.

The pivoting feature of the door assembly of the instant invention insures that the door does not become jammed when it is locked. To that end, when the door is in the locked position, the pivotable tracks 78 are disposed vertically and when the tracks are pivoted away from the opening, the door is unlocked. Accordingly, should the load or cargo within the body shift to engage the inner surface of the door 50 (which with prior art doors would have resulted in the jamming of the door), the door can be unjammed easily by merely pivoting the frames 78 to unlock the door. This action causes the door to move out of engagement with the shifted load. Needless to say, this feature is of considerable importance to cargo carriers since it can substantially eliminate down time of equipment.

An additional advantage of the door assembly of this invention is that when the door is in the locked position, it is located slightly inward from the end wall of the trailer body, whereupon the roof line contiguous with the end wall to minimize the ingress of water at the top of the door during rainy or wet conditions.

The door assembly of the instant invention, while providing all of the aforementioned advantages and features, is nevertheless simple in construction and can be fabricated from readily available components.

Without further elaboration, the foregoing will so fully illustrated my invention that others may, by applying current or future knowledge, readily adapt the same for use under various conditions of service.

What is claimed as the invention is:

1. In a vehicle body for holding cargo therein having a first end, a pair of opposed sidewalls and a roof, said first end including an opening communicating with the interior of said body, the improvement comprising an externally disposed sliding door assembly, said door assembly including sliding door means movable from a stored position above said roof to a pivoted open position wherein said door means covers said opening but is pivoted outward from said opening about a pivot axis located adjacent the bottom of said opening, said door being pivotable to a pivoted closed position wherein said door is pivoted toward said opening to fully close said opening.

2. The external door assembly of claim 1 wherein when said door means is disposed in said stored position it is located within fixedly mounted track means, said fixedly mounted track means being located externally of said body adjacent said roof and said sidewalls.

3. The external door assembly of claim 2 wherein said door means is disposed in said pivoted open or pivoted close position, it is located within pivotably mounted track means, said pivotably mounted track means being mounted on said body and pivotable about said pivot axis between said pivoted open position and pivoted close position, said pivotable track means communicating with said fixed track means when in the pivoted open position to enable the door means to be slid from the former to the latter and vice versa.

4. The door assembly of claim 3 wherein the said door means comprises roller means mounted on the sides thereof for rolling engagement with said track means.

5. The door assembly of claim 4 wherein said door means comprises plural, pivotably connected panel portions.

6. The door assembly of claim 5 including actuator means for pivoting said movable track means between said pivoted open and pivoted closed positions and vice versa.

7. In a vehicle having a body for holding cargo therein, said body comprising a first end wall, a pair of opposed sidewalls and a roof, said first end wall including an opening to the interior of said body, an improved door assembly for closing and locking said opening, said door assembly comprising slidable door means, first track means fixedly mounted along said roof and one of said sidewalls, second track means fixedly mounted along said roof and the other of said sidewalls, each of said track means having an open end located adjacent said body opening, first movable track means having an open end and mounted along one of said sidewalls on one side of said body opening, second movable track means having an open end mounted along the other sidewall on an opposed side of said body opening, said first and second movable track means being pivotable in unison from a locked position, wherein said movable track means are substantially vertical with their respective open ends displaced laterally of the open ends of said fixedly mounted first and second track means, to an unlocked position wherein said movable track means are pivoted outwardly from said body, with the open ends of said first and second fixedly mounted track means in communication with the open ends of said first and second pivotably mounted track means, said slidable door means being arranged to be moved along said fixedly track means from a position located above said roof into said pivotable track means when said track means are in the pivoted open position to cover said opening and enable the movable track means with the door means therein to be pivoted to said locked position to close said bodyopening.

8. The door assembly of claim 7 wherein said first and second fixedly mounted track means are disposed externally of said body.

9. The door assembly of claim 8 wherein said door means comprises roller means mounted on the sides thereof for rolling engagement with said track means.

10. The door assembly of claim 9 wherein said door means comprises plural pivotably connected panel portions.

11. The door assembly of claim 10 including actuator means for pivoting said movable track means.

12. In a vehicle body for holding cargo therein and having a first end wall, second end wall, a pair of opposed sidewalls and a roof, said first end wall including an opening and said second end wall including an opening, each of said openings in communication with the interior of said body, the improvement comprising a first externally disposed sliding door assembly located adjacent said first opening and a second externally disposed sliding door assembly located adjacent said second opening, each of said door assemblies including sliding door means slidable from a stored position above said roof to a pivoted open position wherein said door means covers the associated opening but is pivoted outward from said opening about a pivot axis located adjacent the bottom of said opening, said door means being pivotable to a pivoted closed position wherein said door means is pivoted toward said opening to close said opening and thereby lock cargo within said body.

13. The external door assemblies of claim 12 wherein when each of said door means is disposed in said stored position it is located within fixedly mounted track means, said fixedly mounted track means being located externally of said body adjacent said roof and said sidewalls.

14. The external door assemblies of claim 13 wherein when each of said door means is disposed in said pivoted open or pivoted closed postion, it is located within pivotable track means, said pivotable track means being mounted externally of said body and pivotable about said pivot axis between said pivoted open and pivoted close positions, said pivoted track means communicating with said first track means when said pivoted track means is in the pivoted open position to enable the door means to be slid from the former to the latter and vice versa.

15. The door assemblies of claim 14 wherein said door means comprise roller means mounted on the sides thereof for rolling engagement with said track means.

16. The door assemblies of claim 15 wherein said door means comprises plural pivotable connected panel portions.

17. The door assemblies of claim 16 including actuator means for moving said movable track means.

* * * * *